*William B. Snow,*
*Impt in*
*Means for Adjusting Car Wheels to different Guages.*

118065                                   PATENTED AUG 15 1871

*Witnesses.*

UNITED STATES PATENT OFFICE.

WILLIAM B. SNOW, OF BROOKLYN, NEW YORK.

IMPROVEMENT IN ADJUSTABLE-GAUGE CAR-WHEELS.

Specification forming part of Letters Patent No. 118,065, dated August 15, 1871.

*To all whom it may concern:*

Be it known that I, WILLIAM B. SNOW, of Brooklyn, in the county of Kings and State of New York, have invented a new and useful Improvement in Means for Adjusting Car-Wheels to different Gauges, of which the following is a full, clear, and exact description, reference being had to the accompanying drawing forming part of this specification, and in which—

Figure 4:
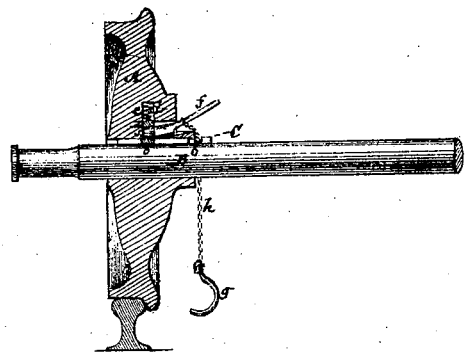
Figure 3:
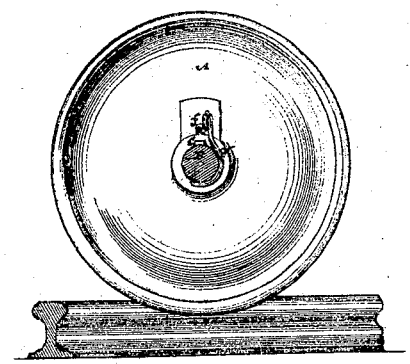
Figure 2:
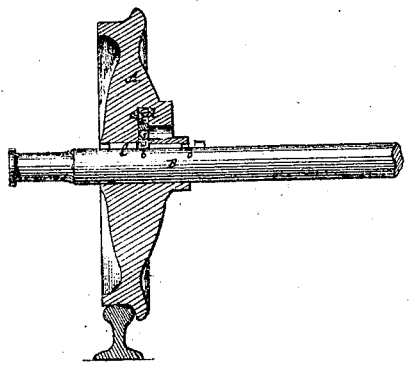
Figure 1:
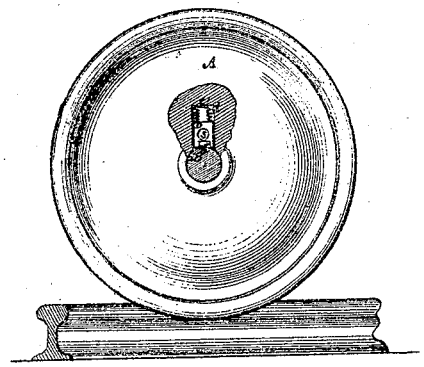

Figure 1 represents an interior face view, partly broken, of a railroad-car wheel as secured on its axle and mounted on a rail; Fig. 2, a vertical section of the same in direction of the length of the axle. Figs. 3 and 4 represent similar views, with a device applied to the wheel to effect its adjustment or change from one gauge to another.

Similar letters of reference indicate corresponding parts.

My improvement relates to means for adjusting the wheels of railroad cars or trucks to different gauges or widths of rail by means of a fixed key or feather inserted in the axle, and formed with cross-grooves or notches at suitable distances apart for locking attachments connected with the wheel to fit into to hold the wheel at its required set, according to the gauge it is required to run upon, as in Letters Patent No. 106,737 of the United States, issued to me August 23, 1870; but this invention differs therefrom, or, as regards the means described in said patent, by using, in combination with the fixed notched key on the axle, a spring-bolt or automatic locking attachment arranged within the car-wheel instead of outside bands, and a bolt passing through the car-wheel having no automatic action. By this improvement the adjustment of the wheel is effected with increased facility and dispatch, a steadier and more secure locking action is established, the passing of a bolt through the wheel is avoided, and a shorter fixed key or feather in the axle suffices.

Referring to the accompanying drawing, A represents a railroad-car wheel made to fit in a close but sliding or adjustable manner, the axle B of the car or truck, and having a key-way in or through its hub to provide for its fit over or along a fixed steel key or feather, C, inserted within the axle, and which is preferably secured therein by shrinking. This fixed key has notches $b$ in it corresponding in number and arrangement with the different gauges it is required to adapt the wheel to, said notches serving to receive the locking device that holds the wheel to its place on the axle. The locking device consists of a bolt, D, let into a recess, $c$, made in the wheel, and acted upon at its back by a metallic spring, $d$, which serves to shoot the bolt into either of the notches $b$, accordingly as the wheel is adjusted inward or outward along the axle. The spring $d$ it is preferred to make of a double-volute form.

To effect the adjustment of the wheel it is first necessary to raise the bolt out of the one notch in the key and then to slide the wheel along the axle till arrested by the bolt shooting into the next notch. To do this a suitably-constructed lever, $f$, may be inserted through a hole in the wheel and into a hole, $s$, in the bolt, with the hub of the wheel for its fulcrum, and a hook, $g$, attached by a chain, $h$, to the lever, be hitched onto the axle and made to bear or hold down on the lever after the latter has been depressed to unlock the bolt, as represented in Fig. 3. This holds the bolt out of lock, so that the wheel may be slid, on commencing to do which the lever is shot or thrown from its hold on the bolt so as to leave the latter free to act.

What is here claimed, and desired to be secured by Letters Patent, is—

The combination, with the fixed notched key or feather C on the axle, of the spring-bolt D, arranged within the wheel for automatic action, as described.

W. B. SNOW.

Witnesses:
 FRED HAYNES,
 FERD TUSCH.